US012723632B2

(12) United States Patent
Hong et al.

(10) Patent No.: US 12,723,632 B2
(45) Date of Patent: Sep. 1, 2026

(54) PISTON FOR BRAKE

(71) Applicant: HL MANDO CORPORATION, Pyeongtaek-si (KR)

(72) Inventors: Seonki Hong, Seoul (KR); Jin Namgung, Seoul (KR); Byungguk Suh, Anseong-si (KR)

(73) Assignee: HL MANDO CORPORATION, Pyeongtaek si (KR)

( * ) Notice: Subject to any disclaimer, the term of this patent is extended or adjusted under 35 U.S.C. 154(b) by 310 days.

(21) Appl. No.: 18/236,055

(22) Filed: Aug. 21, 2023

(65) Prior Publication Data

US 2024/0280152 A1 Aug. 22, 2024

(30) Foreign Application Priority Data

Feb. 21, 2023 (KR) ........................ 10-2023-0022695

(51) Int. Cl.
*F16D 65/18* (2006.01)
*F16D 125/40* (2012.01)

(52) U.S. Cl.
CPC .......... *F16D 65/18* (2013.01); *F16D 2125/40* (2013.01); *F16D 2200/0021* (2013.01); *F16D 2200/003* (2013.01); *F16D 2200/0034* (2013.01); *F16D 2250/0015* (2013.01)

(58) Field of Classification Search
CPC ................. F16D 65/18; F16D 2125/40; F16D 2200/0034; F16D 2200/003; F16D 2200/0021; F16D 2250/0015; F16D 65/005; F16D 2125/06; F16D 2125/08
See application file for complete search history.

(56) References Cited

U.S. PATENT DOCUMENTS 5,931,268 A * 8/1999 Kingston ................ F16D 65/72 188/72.3
6,146,727 A * 11/2000 Dannels ..................... C08J 5/12 188/264 G
7,565,953 B2 * 7/2009 Dalton .................. B60T 13/746 188/1.11 R
7,942,247 B2 * 5/2011 Adachi ............... F16D 65/0025 310/252
8,561,762 B2 * 10/2013 Schupska ............. B60T 13/745 188/72.4

(Continued)

FOREIGN PATENT DOCUMENTS

CN 207261526 U 4/2018
KR 10-1220294 B1 1/2013

(Continued)

OTHER PUBLICATIONS

Korean Intellectual Property Office Application No. 10-2023-0022695, Office Action dated Jun. 25, 2026, 7 pages.

*Primary Examiner* — Henry Y Liu
(74) *Attorney, Agent, or Firm* — LEE, HONG, DEGERMAN, KANG & WAIMEY

(57) ABSTRACT

Disclosed herein is a piston for a brake. The piston for a brake according to the present embodiment includes a body made of a synthetic resin, the body having both ends communicating with each other and both sides hollowed in a cup shape, and a footing made of metal provided from one end side of the body to one side of the inside of the body to prevent external force from being applied directly to the body by a spindle and a brake pad.

15 Claims, 8 Drawing Sheets

(56) References Cited

U.S. PATENT DOCUMENTS 9,850,971 B1 * 12/2017 Demorais ............... F16D 65/18
9,964,165 B2 * 5/2018 Chelaidite ............... B60T 11/04
10,184,535 B2 * 1/2019 Reuss ..................... F16D 65/18
10,288,137 B2 * 5/2019 Chelaidite ............... B60T 11/04
10,309,471 B2 * 6/2019 Kim ...................... B60T 13/741
10,393,200 B2 * 8/2019 Kim .................... F16H 25/2018
10,487,896 B2 * 11/2019 Demorais ............. F16D 55/228
10,563,714 B2 * 2/2020 Demorais ............. F16D 55/225
11,098,777 B2 * 8/2021 Demorais ............. F16D 55/225
11,125,288 B2 * 9/2021 Bahmata ............. F16D 65/0068
11,230,275 B2 * 1/2022 Smith .................... B62D 5/046
11,460,082 B2 * 10/2022 Al-Mahshi ............ F16D 65/183
11,773,936 B2 * 10/2023 Al-Mahshi ............ F16D 55/228
188/72.3
11,835,102 B2 * 12/2023 Smith ..................... F16D 65/18
11,953,065 B2 * 4/2024 Jenkins ............... F16D 65/0006
12,092,177 B2 * 9/2024 Kim .................... F16D 65/0979
12,385,539 B2 * 8/2025 Jedele ..................... F16D 65/18
2007/0034459 A1 * 2/2007 Matsushita ............. B60T 13/74
188/72.6
2008/0135354 A1 * 6/2008 Petri ....................... F16C 17/08
188/73.41
2011/0048869 A1 * 3/2011 Schupska .............. B60T 13/745
188/71.1
2012/0018262 A1 * 1/2012 Winkler .................. F16D 65/18
188/106 F
2012/0325597 A1 * 12/2012 Giering ................... F16D 65/14
188/72.3
2014/0158480 A1 * 6/2014 Qian ..................... B60T 11/102
188/72.8
2015/0053512 A1 * 2/2015 Lee ......................... F16D 65/60
188/72.3
2017/0159733 A1 * 6/2017 Chelaidite ............. F16D 55/226
2017/0356514 A1 * 12/2017 Kim .................... F16H 25/2018
2018/0058524 A1 * 3/2018 Suzuki .................. F16D 65/183
2018/0223932 A1 * 8/2018 Chelaidite ............... F16D 65/14
2018/0298963 A1 * 10/2018 Demorais ............. F16D 55/225
2019/0063519 A1 * 2/2019 Al-Mahshi .......... F16D 55/2262
2019/0316644 A1 * 10/2019 Demorais ............... F16D 65/18
2020/0063811 A1 * 2/2020 Bahmata ............. F16D 65/0068
2020/0158198 A1 * 5/2020 Smith ..................... B60T 1/065
2020/0191211 A1 * 6/2020 Suzuki ................ F16D 65/0087
2020/0309214 A1 * 10/2020 Al-Mahshi ............ F16D 65/183
2021/0348663 A1 * 11/2021 Lou ....................... F16D 65/183
2022/0163076 A1 * 5/2022 Fawcett .................. F16D 65/18
2022/0316539 A1 * 10/2022 Smith ..................... F16D 65/18
2023/0056306 A1 * 2/2023 Tarandek ................ F16D 65/18
2024/0110605 A1 * 4/2024 Jedele ................... B60T 13/741
2024/0247697 A1 * 7/2024 Jedele ................. F16H 25/2015

FOREIGN PATENT DOCUMENTS

KR 10-2017-0139898 12/2017
KR 10-2020-0027635 A 3/2020
KR 10-2022-0137540 10/2022

* cited by examiner

PISTON FOR BRAKE

CROSS-REFERENCE TO RELATED APPLICATION

This application claims the benefit of Korean Patent Application No. 10-2023-0022695, filed on Feb. 21, 2023, in the Korean Intellectual Property Office, the disclosure of which is incorporated herein by reference.

BACKGROUND

1. Field

Embodiments of the present disclosure relate to a piston for a brake, and more particularly, to a piston for a brake capable of simultaneously achieving rigidity and lightweight that are applicable to an electronic caliper brake.

2. Description of the Related Art

An electronic caliper brake employs an electrically driven actuator in addition to a conventional hydraulic disk brake.

In general, the electronic caliper brake includes a disk that rotates together with a wheel of a vehicle; a carrier on which a pair of brake pads are installed to be movable forward and backward to press the disk; a caliper housing which is slidably installed at the carrier, and is provided with a cylinder in which a piston is installed to be movable forward and backward due to a braking hydraulic pressure; a spindle unit that presses the piston; and a motor and a decelerator that transmit a rotational force to the spindle unit.

The conventional electronic caliper brake has a structure that performs a parking function by receiving the rotational force of the motor and pressing the piston due to the spindle unit that converts from rotational motion into rectilinear motion.

In addition, as the spindle unit of the conventional electronic caliper brake is made of metal, it is typical that the piston pressed by the spindle unit is also made of metal.

However, in the case of the piston being made of metal, there is a limitation in that the weight of the electronic caliper brake increases, adversely affecting the fuel efficiency of a vehicle and causing the electronic caliper brake to be inclined.

In addition, in order to prevent the limitation above, the piston is made of metal, yet in the case of using only the minimum number of materials, the amount of fluid required increases due to the increase in the internal volume. Thus, there is a limitation in that the braking response of the electronic caliper brake deteriorates.

Meanwhile, in order to solve the limitation above, in the case of the piston being made of relatively lightweight synthetic resin material, there is a limitation in that the piston is worn or deformed by the spindle unit made of metal.

Further, in the case of the piston being made of relatively lightweight synthetic resin material, there is a limitation in that the piston is deformed or damaged due to the reaction force generated from the brake pad.

SUMMARY

Therefore, it is an aspect of the present disclosure to a piston for a brake and an electronic caliper brake including the same, which is capable of minimizing an increase in the weight of the electronic caliper brake.

It is another aspect of the present disclosure is to provide a piston for a brake and an electronic caliper brake including the same, which is capable of minimizing an increase in the amount of fluid required during the braking due to an increase in the internal volume.

It is still another aspect of the present disclosure is to provide a piston for a brake and an electronic caliper brake including the same, which is capable of prevent abrasion due to the pressing of a spindle made of metal.

It is yet another aspect of the present disclosure is to provide a piston for a brake and an electronic caliper brake including the same, which is capable of prevent deformation and damage due to the reaction force generated from a brake pad.

Additional aspects of the disclosure will be set forth in part in the description which follows and, in part, will be obvious from the description, or may be learned by practice of the disclosure.

In accordance with one aspect of the present disclosure, a piston for a brake including: a body including a spindle entry which is provided at one end, and a footing fastener which is provided at the other end, and a first anti-rotation part provided between the spindle entry and the footing fastener; a the footing including a footing rod insertedly fixed to the footing fastener, and a footing plate provided at one end of the footing rod and supported by a footing support to thus be coupled to the body.

The spindle entry may include a body taper in which the cross-sectional area decreases toward the first anti-rotation part.

The footing fastener may include at least one ring-shaped sealing protrusion provided on the inner circumferential surface.

The footing rod may include a sealing groove into which the sealing protrusion is inserted.

The body may further include a sealing member fastening groove provided on the outer circumferential surface of the end side in which the footing fastener is provided for fastening the sealing member for sealing with the cylinder provided so that the piston for a brake moves forward and backward.

The footing rod may include a spindle accommodation part provided with a second anti-rotation part extending from one end of the first anti-rotation part inside the footing rod, and a footing taper extending from the second anti-rotation part on the footing plate side.

The first anti-rotation part may be provided not to be in contact with a spindle, and the second anti-rotation part may be provided to be in contact with the spindle.

The footing plate may include at least one guide hole provided in the direction of the forward and backward motion of the piston for a brake.

The footing support part may further include a guide groove extending from the guide hole in the direction of the forward and backward motion of the piston for a brake.

The body may further include a stepped part provided between the second anti-rotation part and the footing fastener.

The stepped part may include at least two first anti-separation protrusions protruding toward the footing rod.

The footing rod may include a first anti-separation groove into which the first anti-separation protrusion is inserted.

The body may further include at least two second anti-separation grooves provided on the surface on which the footing plate is supported.

The footing plate may include a second anti-separation protrusion inserted into the second anti-separation groove.

The body and the footing may be integrally provided by an insert injection molding.

In accordance with another aspect of the present disclosure, a piston for a brake includes a body made of a synthetic resin, the body having both ends communicating with each other and both sides hollowed in a cup shape, and a footing made of metal provided from one end side of the body to one side of the inside of the body to prevent external force from being applied directly to the body by a spindle and a brake pad.

The body may include a spindle entry which is provided at one end and into which the spindle is inserted, and a footing fastener which is provided at the other end and into which the footing is fastened, and the footing may include a footing rod in which the spindle is inserted and secured into the footing fastener and inside which one end of the spindle is accommodated, and a footing plate provided at one end of the footing rod to press the brake pad.

The piston for a brake may include a sealing protrusion and a sealing groove provided between the footing fastener and the footing rod, respectively, for sealing between the body and the footing.

The footing rod may include a second anti-rotation part provided to prevent the spindle from rotating.

The body may be made of lightweight material, including any one among aluminum, polymer resin, and phenol resin, and the footing may be made of steel, so that the body and the footing may be provided integrally by an insert injection molding.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
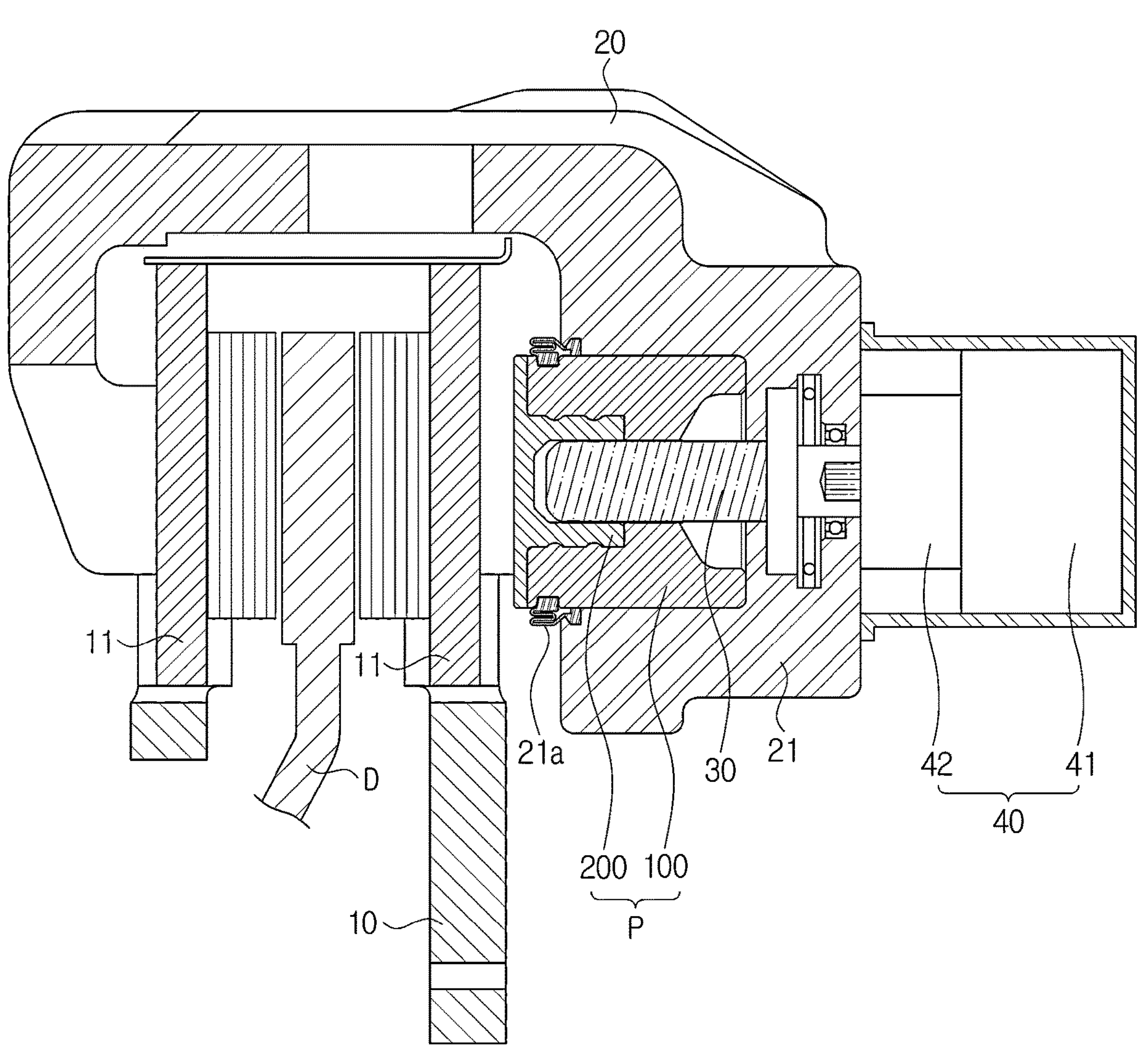
FIG. 1 is a cross-sectional view illustrating an electronic caliper brake including a piston for a brake according to an embodiment of the present disclosure.

Hereinafter, embodiments of the present disclosure will be described in detail with reference to the accompanying drawings. The following embodiments are provided to fully convey the spirit of the present disclosure to a person skilled in the art. The present disclosure is not limited to the embodiments disclosed herein and may be implemented in other forms. In the drawings, some portions not related to the description will be omitted and will not be shown in order to clearly describe the present disclosure, and also sizes of components may be somewhat exaggerated to help understanding.

FIG. 1 is a cross-sectional view illustrating an electronic caliper brake including a piston for a brake according to an embodiment of the present disclosure.

Referring to FIG. 1, an electronic caliper brake including a piston for a brake according to an embodiment of the present disclosure includes: a carrier 10 on which a pair of brake pads 11 are installed to be movable forward and backward in order to press a disk D that rotates together with a wheel of a vehicle; a caliper housing 20 which is slidably installed at the carrier 10 and is provided with a cylinder 21 in which a piston P is installed to be movable forward and backward due to a braking hydraulic pressure; a spindle 30 that moves rectilinearly with the rotation of the spindle nut (not shown) and presses the piston P; and an actuator 40 including a motor 41 and a decelerator 42 that transmit a rotational force to the spindle nut.

Here, the spindle 30 is screwed with the spindle nut and is provided to be restricted in the rotation within the piston P. Thus, the spindle 30 is configured to move rectilinearly with the rotation of the spindle nut.

Figure 2:
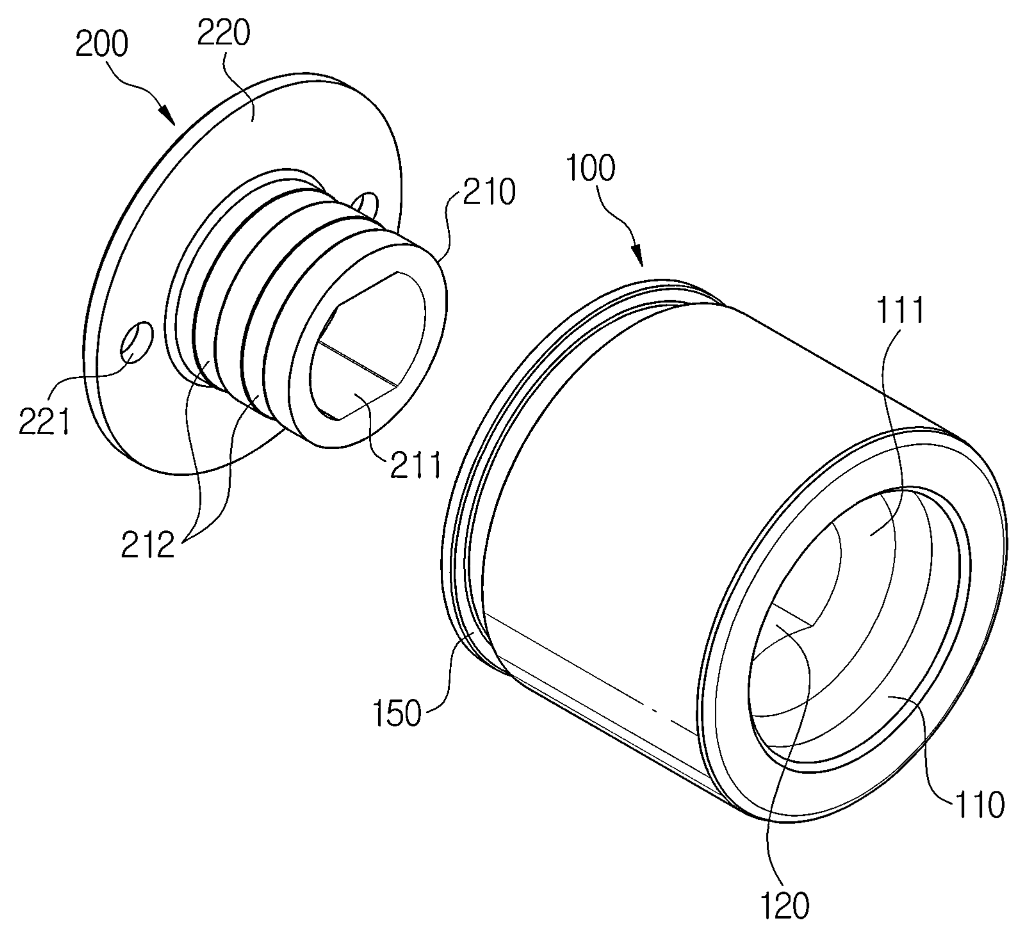
FIG. 2 is a front exploded perspective view of the piston for a brake according to the embodiment of the present disclosure.
Figure 3:
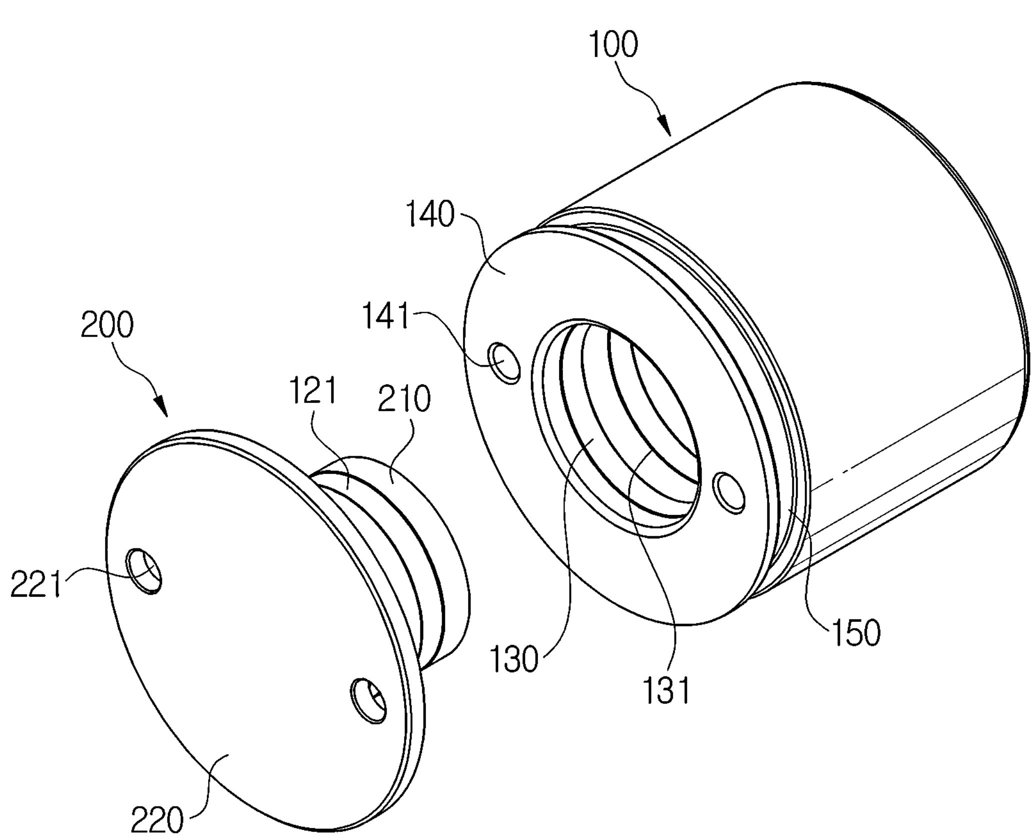
FIG. 3 is a rear exploded perspective view of the piston for a brake according to the embodiment of the present disclosure.
Figure 4:
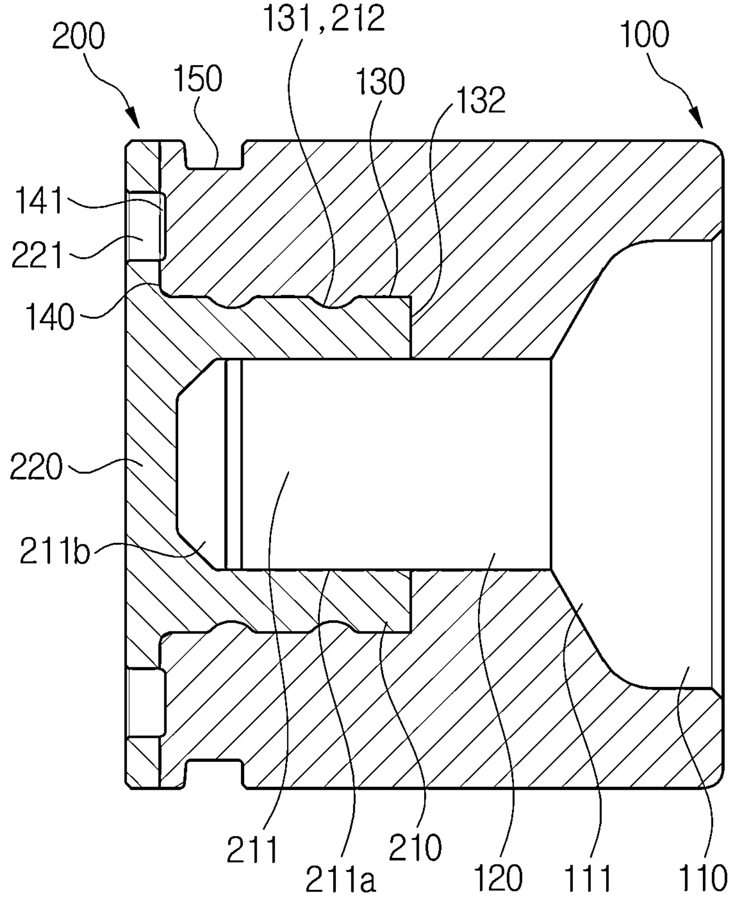
FIG. 4 is a cross-sectional view of the piston for a brake according to the embodiment of the present disclosure.

FIGS. 2 to 4 are a front exploded perspective view, a rear exploded perspective view, and a cross-sectional view, respectively, of the piston for a brake according to the embodiment of the present disclosure.

Referring to FIGS. 1 to 4, the piston for a brake according to the embodiment of the present disclosure includes: a body 100 made of a synthetic resin, the body 100 having both ends communicating with each other and both sides hollowed in a cup shape; and a footing 200 made of metal provided from one end side of the body 100 to one side of the inside of the body 100 in order to prevent external force from being applied directly to the body 100 by a spindle 30 and a brake pad 11.

More specifically, the body 100 includes: a spindle entry 110 which is provided at one end and into which the spindle 30 is inserted; a footing fastener 130 which is provided at the other end and into which the footing 200 is fastened; and a first anti-rotation part 120 provided between the spindle entry 110 and the footing fastener 130.

The footing 200 includes a footing rod 210 insertedly fixed to the footing fastener 130; and a footing plate 220 provided at one end of the footing rod 210 and supported by a footing support 140.

The body 100 is made of lightweight material, such as aluminum, polymer resin, and phenol resin, and the footing 200 is made of steel and integrally provided by an insert injection molding. That is, the body 100 may be made of a lighter material compared to the footing 200.

In order to minimize the increase in the internal volume of the body 100, the first anti-rotation part 120 may be provided to have a cross-sectional shape corresponding to the shape of the head side of the spindle 30 so that the first anti-rotation part 120 is not in direct contact with the spindle 30.

The spindle entry 110 includes a body taper 111 that decreases in the cross-sectional area toward the first anti-rotation part 120.

Here, the body taper 111, similar to the first anti-rotation part 120, may minimize the increase in the internal volume of the body 100 while improving the flowability of fluid entering the interior of the body 100.

The footing fastener 130 includes at least one ring-shaped sealing protrusion 131 provided on the inner circumferential surface.

In this case, the footing rod 210 includes a sealing groove into which the sealing protrusion 131 is inserted.

Accordingly, the piston for a brake according to the embodiment of the present disclosure may be sealed between the body 100 and the footing 200 without a separate sealing member.

In addition, the body 100 further includes a stepped part 132 provided between the second anti-rotation part 221*a* and the footing fastener 130, thereby more stably supporting the footing 200.

Meanwhile, as illustrated in FIG. 1, the body 100 may further include a sealing member fastening groove 150 provided on the outer circumferential surface of the end side in which the footing fastener 130 is provided for fastening the sealing member 21*a* for sealing with the cylinder 21 in which the piston for a brake is provided to move forward and backward.

The footing rod 210 includes a spindle accommodation part 211 in which a second anti-rotation part 211*a* extending from one end of the first anti-rotation part 120 is provided therein and a footing taper 211*b* extending from the second anti-rotation part 211*a* is provided on the footing plate 220.

Here, the second anti-rotation part 211*a* is in close contact with the surface of the head side of the spindle 30 to prevent the rotation of the spindle 30 and guide the rectilinear motion.

More specifically, the first anti-rotation part 120 is provided not to be in contact with the spindle 30, and the second anti-rotation part 211*a* is provided to be in contact with the spindle 30 so that the body 100 may not be subjected to a direct external force by the spindle 30.

To this end, the cross-sectional area of the first anti-rotation part 120 may be larger than the cross-sectional area of the second anti-rotation 211*a*.

The footing plate 220 includes at least one guide groove 221 provided in a direction of forward and backward motion of the piston for a brake.

In this case, the footing support part 140 may further include a guide groove 141 extending from the guide hole 221 in the direction of the forward and backward motion of the piston for a brake.

Here, the guide hole 221 and the guide groove 141 may be not only utilized as a guide structure for aligning the footing 200 with a mold when the body 100 and the footing 200 are made through an insert injection molding, but also utilized as a structure into which a tool is inserted for alignment between the footing 200 and the body 100 in the case where the footing 200 rotates about an axis in the longitudinal direction of the piston for a brake from the body 100, and the misalignment between the footing 200 and the body 100 occurs.

Accordingly, the piston for a brake according to the embodiment of the present disclosure may significantly improve the durability as the external force generated from the spindle 30 and the brake pad 11 is not directly applied to the body 100, which is relatively weak in strength, but is applied to the footing 200, which is made of metal, while minimizing an increase in the amount of fluid required due to lightweight and an increase in the internal volume.

Figure 5:
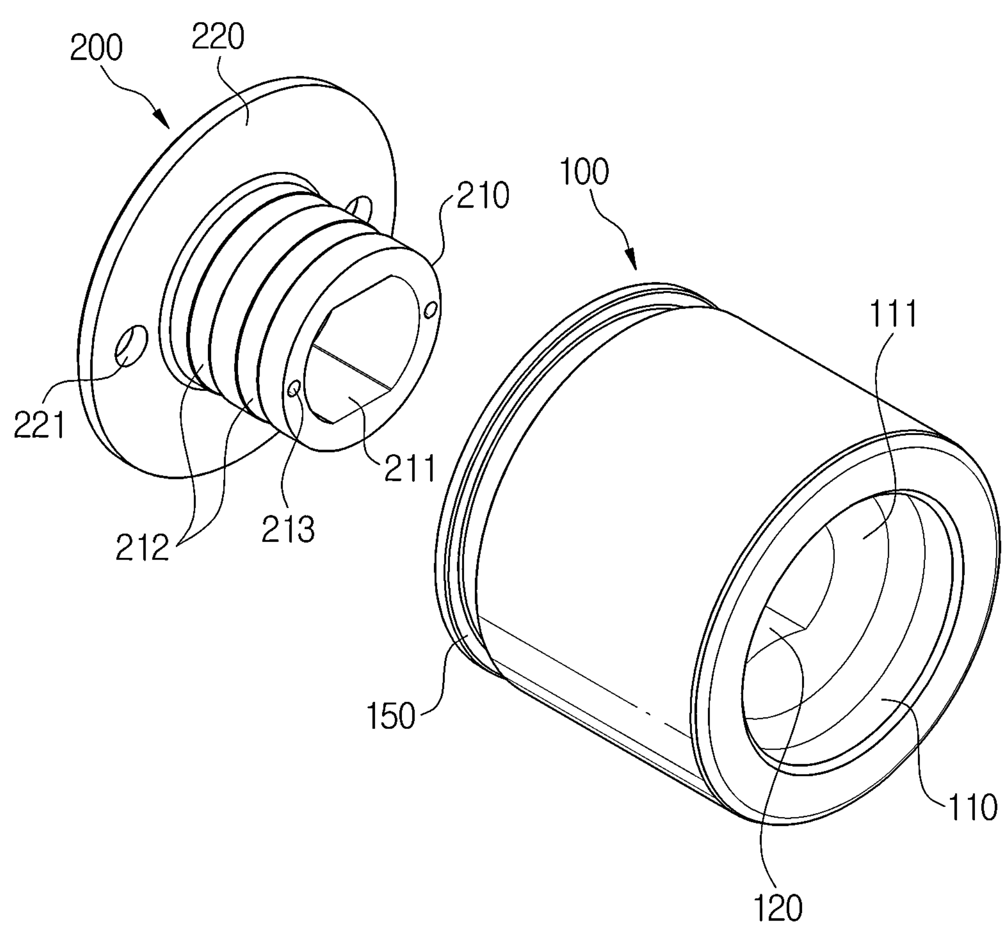
FIG. 5 is an exploded perspective view of a piston for a brake according to another embodiment of the present disclosure.
Figure 6:
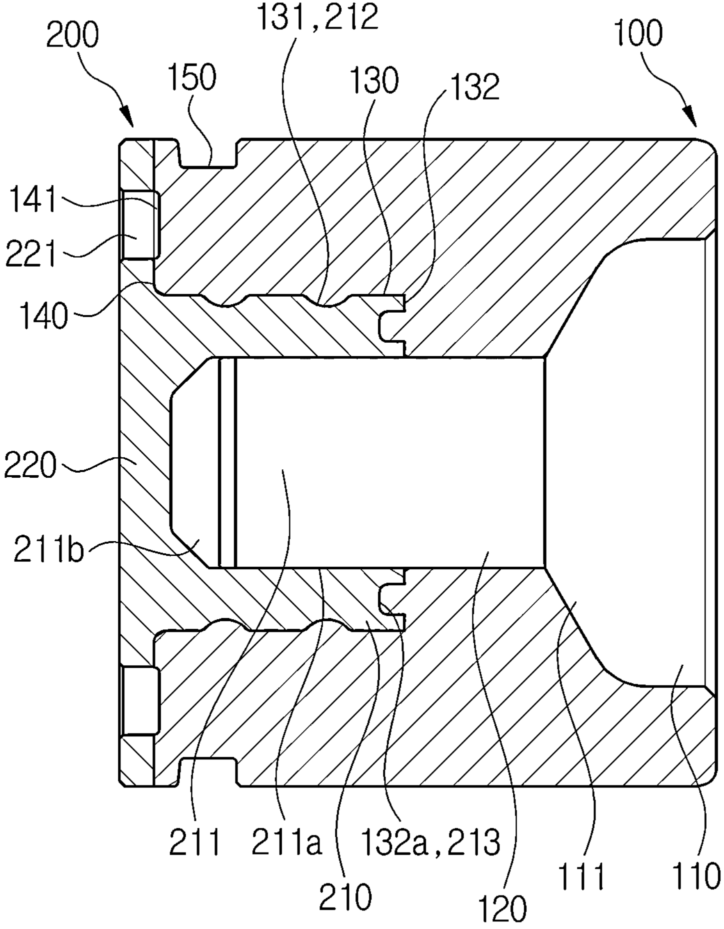
FIG. 6 is a cross-sectional view of the piston for a brake according to the another embodiment of the present disclosure.

Meanwhile, FIGS. 5 and 6 are an exploded perspective view and a cross-sectional view, respectively, of a piston for a brake according to another embodiment of the present disclosure.

Referring to FIGS. 5 and 6, the piston for a brake according to another embodiment of the present disclosure may include at least two first anti-separation protrusions 132*a* protruding toward the footing rod 210 in the stepped part 132.

In this case, the footing rod 210 may include a first anti-separation groove 213 into which the first anti-separation protrusion 132*a* is inserted, and prevent the misalignment between the footing 200 and the body 100, such as the rotation of the footing 200 about an axis in the longitudinal direction of the piston for a brake from the body 100.

In addition, the position of the first anti-separation protrusion 132*a* and the first anti-separation groove 213 may be switched.

Figure 7:
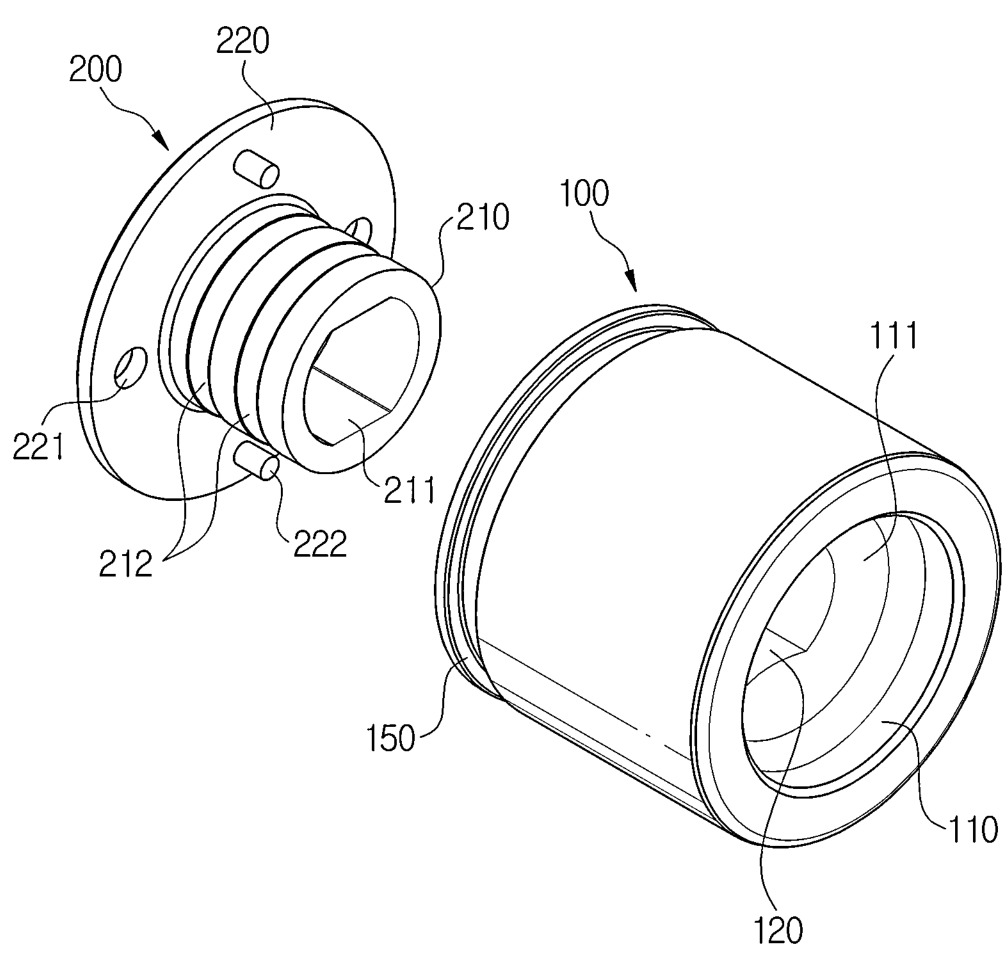
FIG. 7 is an exploded perspective view of a piston for a brake according to still another embodiment of the present disclosure.
Figure 8:
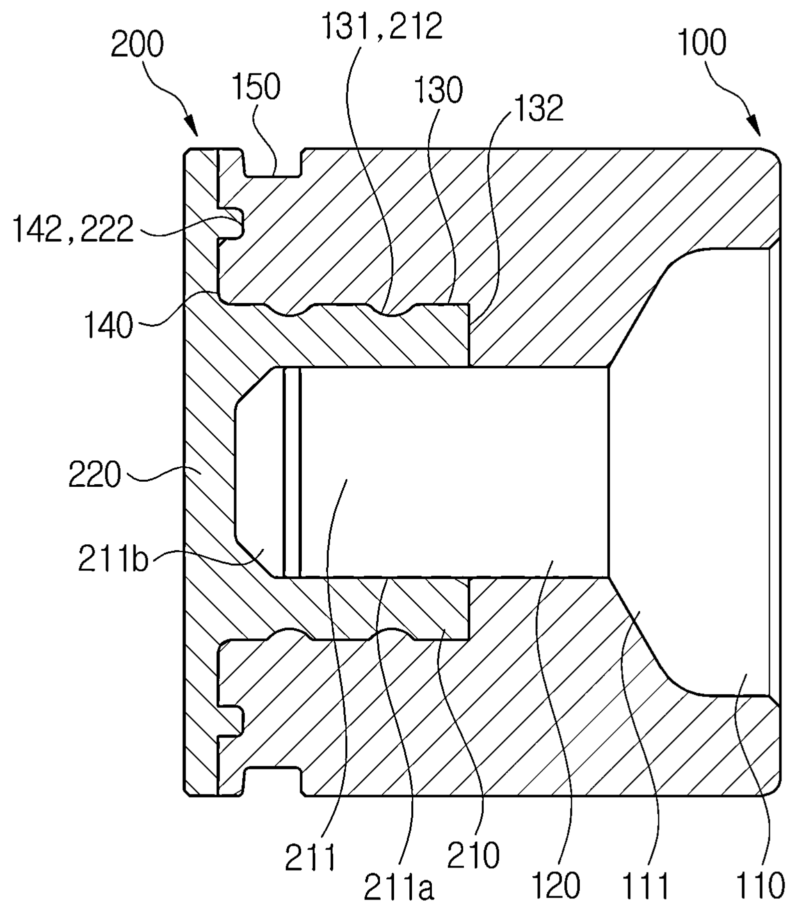
FIG. 8 is a cross-sectional view of the piston for a brake according to the still another embodiment of the present disclosure.

Meanwhile, FIGS. 7 and 8 are an exploded perspective view and a cross-sectional view, respectively, of a piston for a brake according to still another embodiment of the present disclosure.

Referring to FIGS. 7 and 8, the piston for a brake according to still another embodiment of the present disclosure may further include at least two second anti-separation grooves 142 provided on the surface on which the footing plate 220 is supported.

In this case, the footing plate 220 may include a second anti-separation protrusion 222 inserted into the second anti-separation groove 142 and prevent the misalignment between the footing 200 and the body 100, such as the rotation of the footing 200 about an axis in the longitudinal direction of the piston for a brake from the body 100.

In addition, the position of the second anti-separation protrusion 222 and the second anti-separation groove 142 may be switched.

In addition, although not illustrated, the piston for a brake according to an embodiment of the present disclosure may include all of the first anti-separation protrusion 132*a*, the first anti-separation groove 213, the second anti-separation protrusion 222, and the second anti-separation groove 142.

Therefore, the pistons for a brake according to the present embodiments improve the fuel efficiency of a vehicle by minimizing the increase in the weight of electronic caliper brake, prevent the inclination of an electronic caliper brake due to the weight, and improve braking response by minimizing an increase in the amount of fluid required during the braking due to an increase in the internal volume.

In particular, the pistons for a brake according to the present embodiments may be lightweight while significantly improving the durability as the external forces generated by the spindle 30 and the brake pad 11 are applied to the footing 200, which is made of metal, rather than directly to the body 100, which is relatively weak in strength.

The piston for a brake according to the present embodiment may improve the fuel efficiency of a vehicle by minimizing an increase in the weight of the electronic caliper brake and may prevent the electronic caliper brake from being inclined due to the weight.

The piston for a brake according to the present embodiment may improve the braking response of the electronic caliper brake by minimizing an increase in the amount of fluid required during the braking due to an increase in internal volume.

The piston for a brake according to the present embodiment may improve the durability of the piston by preventing abrasion due to the pressing of the spindle made of metal.

The piston for a brake according to the present embodiment may improve the durability of the piston by preventing deformation and damage due to the reaction force generated by the brake pad.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A piston for a brake comprising:

a body including a spindle entry which is provided at one end, and a footing fastener which is provided at the other end, and a first anti-rotation part provided between the spindle entry and the footing fastener; and a footing including a footing rod insertedly fixed to the footing fastener, and a footing plate provided at one end of the footing rod and supported by a footing support to thus be coupled to the body, wherein the footing fastener comprises at least one ring-shaped sealing protrusion provided on the inner circumferential surface, and wherein the footing fastener comprises at least one ring-shaped sealing protrusion provided on the inner circumferential surface.

2. The piston of claim 1, wherein the spindle entry comprises a body taper in which a cross-sectional area of the spindle entry decreases toward the first anti-rotation part.

3. The piston of claim 1, wherein the body further comprises a sealing member fastening groove provided on an outer circumferential surface of an end side in which the footing fastener is provided for fastening the sealing member for sealing with a cylinder provided so that the piston for a brake moves forward and backward.

4. The piston of claim 1, wherein the footing rod comprises a spindle accommodation part provided with:

a second anti-rotation part extending from one end of the first anti-rotation part inside the footing rod; and a footing taper extending from the second anti-rotation part on the footing plate side.

5. The piston of claim 1, wherein the footing plate comprises at least one guide hole provided in a direction of a forward and backward motion of the piston for a brake.

6. The piston of claim 5, wherein the footing support further comprises a guide groove extending from the guide hole in the direction of the forward and backward motion of the piston for a brake.

7. The piston of claim 4, wherein the body further comprises a stepped part provided between the second anti-rotation part and the footing fastener.

8. The piston of claim 7, wherein the stepped part comprises at least two first anti-separation protrusions protruding toward the footing rod.

9. The piston of claim 8, wherein the footing rod comprises a first anti-separation groove into which the first anti-separation protrusion is inserted.

10. The piston of claim 1, wherein the body further comprises at least two second anti-separation grooves provided on a surface on which the footing plate is supported.

11. The piston of claim 10, wherein the footing plate comprises a second anti-separation protrusion inserted into the second anti-separation groove.

12. The piston of claim 1, wherein the body and the footing are integrally arranged by an insert injection molding.

13. A piston for a brake comprising:

a body made of a synthetic resin, the body having both ends communicating with each other and both sides hollowed in a cup shape; and a footing made of metal provided from one end side of the body to one side of the inside of the body to prevent external force from being applied directly to the body by a spindle and a brake pad, wherein the body comprises:

a spindle entry which is provided at one end and into which the spindle is inserted; and a footing fastener which is provided at the other end and into which the footing is fastened, wherein the footing comprises:

a footing rod in which the spindle is inserted and secured into the footing fastener and inside which one end of the spindle is accommodated; and a footing plate provided at one end of the footing rod to press the brake pad, wherein the footing fastener comprises at least one ring-shaped sealing protrusion provided on the inner circumferential surface, and wherein the footing rod comprises a sealing groove into which the sealing protrusion is inserted.

14. The piston of claim 13, wherein the footing rod comprises a second anti-rotation part provided to prevent the spindle from rotating.

15. The piston of claim 13, wherein the body is made of lightweight material, including any one among aluminum, polymer resin, and phenol resin, and the footing is made of steel, so that the body and the footing are provided integrally by an insert injection molding.

* * * * *